United States Patent [19]

Klieber

[11] Patent Number: 5,154,094
[45] Date of Patent: Oct. 13, 1992

[54] AERO-TYPE HANDLEBAR WITH FOREARM SUPPORTS

[76] Inventor: Jochen Klieber, Dammweg 1, D-8221 Tacherting, Fed. Rep. of Germany

[21] Appl. No.: 721,708

[22] Filed: Jun. 26, 1991

[30] Foreign Application Priority Data

Jul. 13, 1990 [DE] Fed. Rep. of Germany ....... 4022434

[51] Int. Cl.⁵ ............................................. B62K 21/12
[52] U.S. Cl. .................................. 74/551.1; 74/551.8; 280/261
[58] Field of Search ............................ 74/551.1–551.9; 280/261, 288.4, 281.1; D12/178

[56] References Cited

U.S. PATENT DOCUMENTS

| | | | |
|---|---|---|---|
| 4,726,600 | 2/1988 | Wu | 74/551.1 X |
| 4,750,754 | 6/1988 | Lennon | 74/551.8 |
| 4,873,886 | 10/1989 | Renner | 74/551.8 |
| 4,878,397 | 11/1989 | Lennon | 74/551.8 X |
| 5,000,469 | 3/1991 | Smith | 74/551.1 X |

FOREIGN PATENT DOCUMENTS 0012218 4/1897 United Kingdom ............... 74/551.1

OTHER PUBLICATIONS

Scott U.S.A., P.O. Box 2030 Sun Valley, Idaho 83353; 1990.

*Primary Examiner*—Richard E. Chilcot, Jr.
*Assistant Examiner*—Winnie Yip
*Attorney, Agent, or Firm*—Tilton, Fallon, Lungmus & Chestnut

[57] ABSTRACT

The invention relates to an aero-type handlebar to be connected to a racer-type handlebar or mountain bike handlebar comprising two handlebar legs respectively connectable with the racer-type handlebar, projecting in the riding direction beyond the grips of the racer-type handlebar and having at its projecting ends a grip portion for a righthand or a lefthand grip, the distance between the grips of the handlebar legs being smaller than the distance between the grips of the racer-type or mountain bike handlebar. The invention accomplishes the object to suggest an improved aero-type handlebar of this time. The aero-type handlebar according to the invention is characterized in that one forearm support element each is provided on the handlebar legs, which has a support surface shaped in accordance with the forearm. The support surface according to the invention facilitates the use of the aero-type handlebar substantially.

25 Claims, 3 Drawing Sheets

AERO-TYPE HANDLEBAR WITH FOREARM SUPPORTS

BACKGROUND OF THE INVENTION

Field of the Invention

The invention relates to an aero-type handlebar to be connected to a racer-type handlebar comprising two handlebar legs respectively connectable with racer-type handlebar, projecting in the riding direction beyond the grips of the racer-type handlebar and having at its projecting ends a grip portion for a righthand or a lefthand grip, the distance between the grips of the handlebar legs being smaller than the distance between the grips of the racer-type handlebar.

Such a so-called aero-type handlebar serves for reducing the air resistance of a racing cyclist. When using the aero-type handlebar the racing cyclist adopts a greatly stooped posture when grasping the grips of the aero-type handlebar which are disposed a long distance forwardly and the shoulders are pulled together closely due to the small distance between the grips of the aero-type handlebar. Thus, both the cross-sectional surface of the racing cyclist which is effective with respect to the air resistance and also its drag coefficient (Cw value) are reduced. The drag coefficient decreases in particular due to the fact that the hands and arms of the racing cyclist cover the breast and belly surface of the cyclist, which is concave against the blowing air in the stooped posture, and thus a by far more streamlined form is achieved. The racing cyclist can use the aero-type handlebar connected with the customary racer-type handlebar advantageously in particular if the steering of the racing bicycle does not require any special watchfulness such as in long straight-ahead rides or individual rides.

Aero-type handlebars of the type mentioned at the beginning are known whose handlebar legs are detachably connected with the extension of the racer-type handlebar. The extension of the racer-type handlebar is produced in two-membered fashion using pipe material and the two handlebar legs can be inserted into the projecting pipe ends of the extension for connection with the racer-type handlebar.

It is the object of the invention to provide an aero-type handlebar of the type mentioned at the beginning, which is improved as compared with the prior art.

SUMMARY OF THE INVENTION

The aero-type handlebar according to the present element each is provided on the handlebar legs, which has a support surface shaped in accordance with the shape of the forearm.

Due to this solution according to the invention it is achieved by the support on the asymmetric forearm support elements adapted to the forearms that the pronounced, extensively forward bent posture necessary in the use of the aero-type handlebar strains and tires the cyclist less.

It can be provided in a further advantageous development of the invention that the support element is disposed in an optimum support position directly behind or at the level of a transverse rod of the racer-type handlebar connected with the extension of the racer-type handlebar in the riding direction.

In an advantageous development of the invention the position of the support elements can be adjustable on the handlebar legs and thus be adapted to different body dimensions of the cyclist or to desired support positions.

In a further suitable embodiment of the invention it can be provided for the additional relief of the forearms that the support surface of the support elements has an air, liquid or/and foam rubber padding.

The end portions of the handlebar which are opposite to the grips of the handlebar legs are preferably laterally outwardly bent, and the forearm support elements are substantially disposed displaceably within certain limits at the ends of the bent end portions, the end portions being bent directly behind the connection points of the handlebar legs with the racer-type handlebar in the riding direction. The bent portions have preferably a cross-section flattened increasingly towards the end, which facilitates a rotation-free fastening of the support on the end portions and moreover increases elasticity so that an advantageous spring effect takes place.

It can be provided in a further advantageous development of the invention that the handlebar legs are connected with each other forming an aero-type handlebar strap at their grip ends projecting in the riding direction, the connection being advantageously effected via an intermediate element made of plastic material. Due to such a strap-like design of the aero-type handlebar its stability is improved on the one hand, and, on the other hand, the intermediate element can be advantageously used for mounting instruments such as for mounting a riding computer.

Further advantageous development possibilities of the invention are revealed by the sub-claims.

The invention is now further explained and described by means of an example of embodiment and the drawings relating to this example of embodiment.

DESCRIPTION OF THE PREFERRED EMBODIMENT

Figure 1:
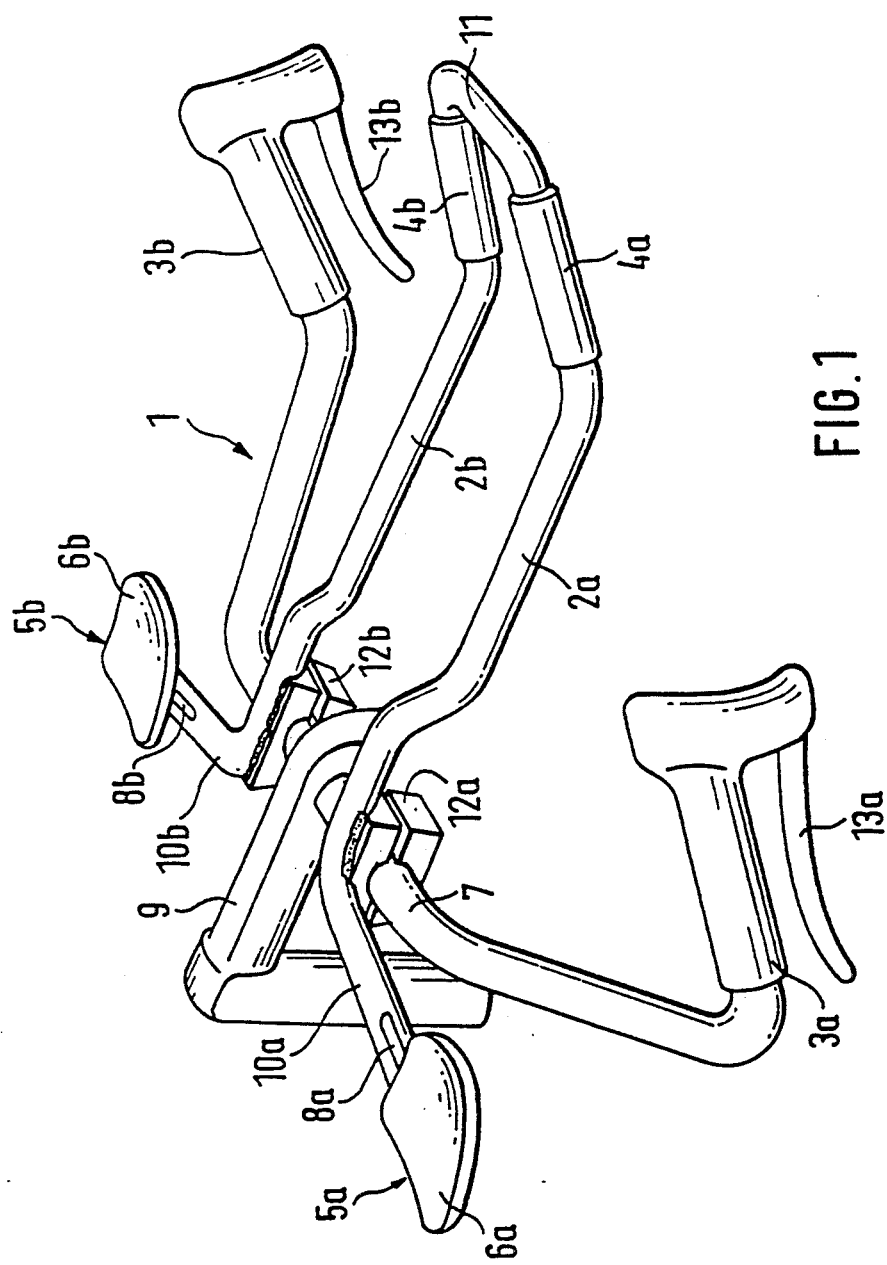
FIG. 1 shows a perspective view of an example of embodiment for an aero-type handlebar.
Figure 2:
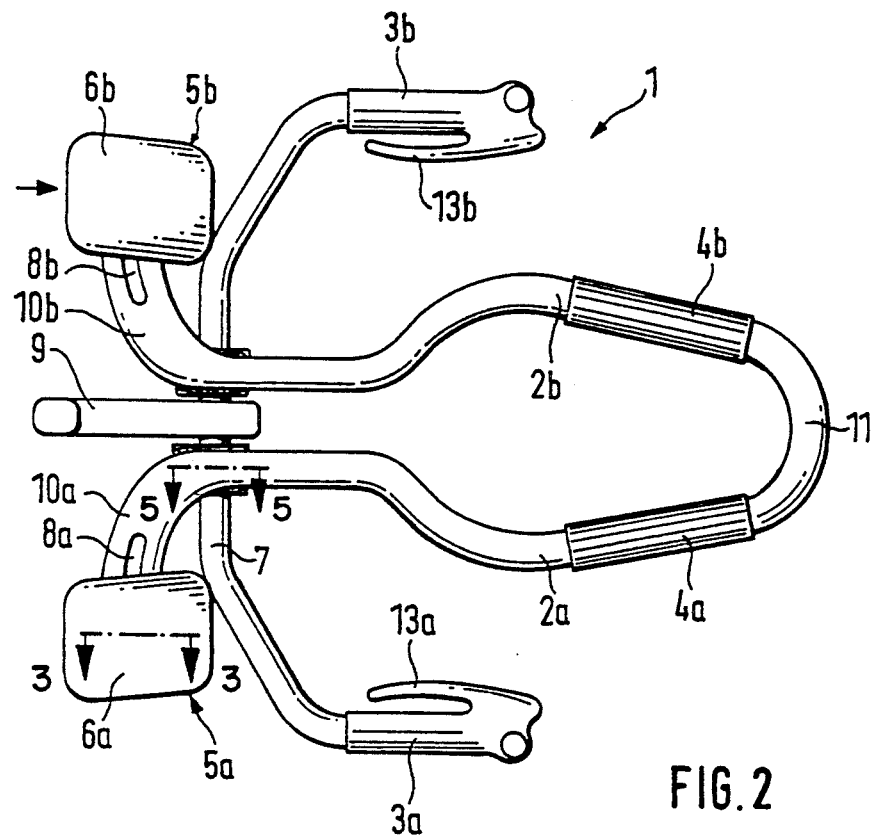
FIG. 2 shows a top view of the example of embodiment of FIG. 1.

A racer-type handlebar is designated with the reference numeral 1 in FIGS. 1 and 2, to which an aero-type handlebar having two handlebar legs 2a and 2b is fastened. The fastening is effected via clamping elements 12a and 12b which will be described in greater detail in the following by means of FIG. 5.

In the present example of embodiment the racer-type handlebar has a one-membered extension 9, to whose front end a handlebar transverse rod 7 is fastened. The handlebar transverse rod 7 is guided through a passage in the front end of the extension 9 and clamped in this passage. The transverse rod 7 of the racer-type handlebar 1, which is obliquely downwardly bent on both sides, has in each case a (righthand) grip 3a and a (lefthand) grip 3b at its ends, the racer-type grips being bent in such fashion from the transverse rod that they are obliquely upwardly directed in the riding direction. Lever brakes 13a and 13b are provided on the racer-type grips 3a and 3b. Bowden cables connected with the lever brakes 13a and 13b are guided through the transverse rod 7 of the racer-type handlebar 1 and not visible in FIGS. 1 and 2.

The handlebar legs 2a and 2b of the aero-type handlebar are fastened to the transverse rod 7 near the centre of the handlebar at both sides of the fastening point between the handlebar rod 7 and the extension 9. The handlebar legs produced in the present example of embodiment from a pipe material, preferably an aluminum pipe have in each case a (righthand) aero-type grip 4a or (left-hand) grip) aero-type 4b, the grip portions of the handlebar legs being obliquely upwardly bent in the riding direction. A connection piece is designated with 11 which connects the front ends of the handlebar legs 2a and 2b with each other forming an aero-type handlebar strap and consists of plastic material in the present example of embodiment. A continuous pipe could also be used for producing such an aero-type handlebar strap, which is correspondingly bent. The plastic intermediate element will be described later in greater detail by means of FIG. 6.

The handlebar legs are in each case bent directly outwardly behind the connecting points on the transverse rod 7 on the ends being rear in the riding direction and have in the present example of embodiment bent end portions 10a and 10b which extend approximately in parallel to the transverse rod 7. The connecting point of the handlebar legs on the transverse rod is still in the area of the radius of bending in the present example of embodiment. The pipe forming the handlebar legs is flattened towards the rear end of the handlebar legs, the flattening beginning before the connecting point of the handlebar legs on the transverse rod 7 in the riding direction and the degree of the flattening continuously increasing towards the end of the handlebar legs being rearward in the riding direction. Support elements 5a and 5b with forearm support surfaces 6a or 6b are fastened to the bent end portions 10a and 10b of the handlebar legs. The support elements consisting substantially of a thermoplast in the present example of embodiment are connected via a screw connection as it will be described in greater detail in the following by means of FIG. 3 with the handlebar legs. A connecting screw is guided in each case through an oblong hole 8a or 8b by means of which it is ensured that the position of the support elements 5a and 5b on the handlebar legs can be varied within certain limits. The asymmetric support surfaces 6a and 6b of the support elements 5a and 5b are concavely arched seen from above, the support surface corresponding in their arching approximately to a cylinder jacket surface and having a substantially straight root line which is approximately aligned to the grip of the aero-type handlebar allocated to the respective support element.

As noted in FIGS. 1 and 2, the aero-type grips 4a, 4b are spaced apart from each other by a distance which is smaller than the corresponding distance between the racer-type grips 3a, 3b.

Figure 3:
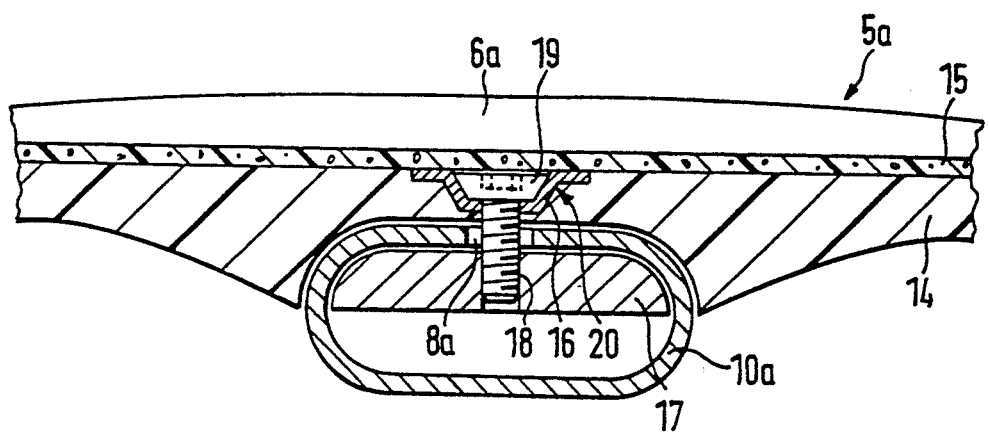
FIG. 3 shows a sectional view of a fastening of a forearm support element on a handlebar leg according to the sectional line 3—3 of FIG. 2.

As is revealed by FIG. 3, the support elements consist of a preferably one-piece plastic body 14 which is produced as moulded element from a POM thermoplast, which is shaped at its side opposite to the support surface 6a in such fashion that it rests in form-fit fashion on the flattened end portion 10a or 10b and encompasses the circumference of the end portion at least partly. As opposed to the example of embodiment represented in FIG. 3, the plastic element could also have a passage for the flattened end portion. The plastic body 14 is provided with a recess 20 in which a washer 16 is received, which is of a conical form and has a conical recess for a correspondingly shaped screw head of a screw 19. The screw 19 traverses the slot 8a in the handlebar leg and engages into a thread 18, which is formed in a counterpart 17 introduced into the handlebar leg, which is largely adapted to the inner surface of the handlebar leg. A pad resting on the plastic element 14 is designated with 15, which consists of foam rubber in the present example of embodiment and on which the plastic element 14 is detachably fastened. This fastening can e.g. be effected advantageously by means of a Velcro fastener not shown in FIG. 3. Pads with an air or liquid filling could also be provided instead of the foam rubber pad. A carbon compound material could also be used advantageously as material for a body corresponding to the plastic body 14. The screw 19 and the counterpart 17 serve as locking means to retain the forearm support elements 5a, 5b.

Figure 4:
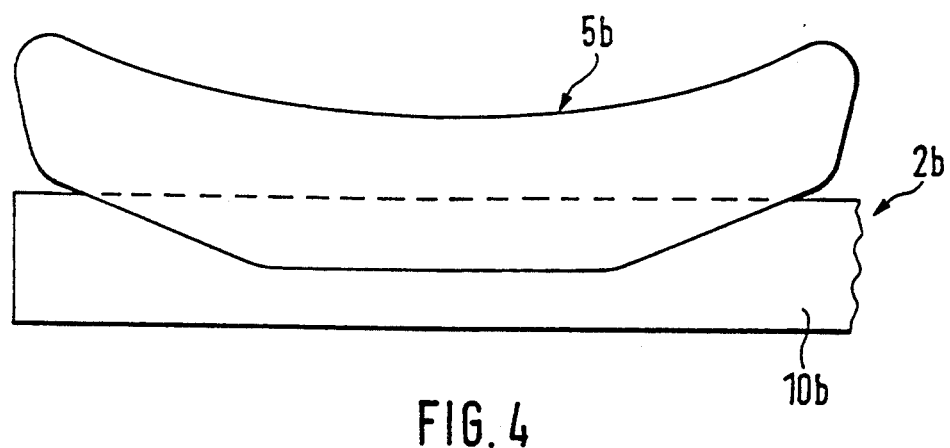
FIG. 4 shows a top view of a forearm support element disposed on a handlebar leg from a direction according to the arrow B of FIG. 2.

FIG. 4 reveals that the support element only rests on the end portion 10b of the handlebar leg 2b in form-fit fashion across part of its width in its central area. As opposed to the present example of embodiment, such a form-fit support could e.g. also be provided across the entire width of the support element.

Figure 5:
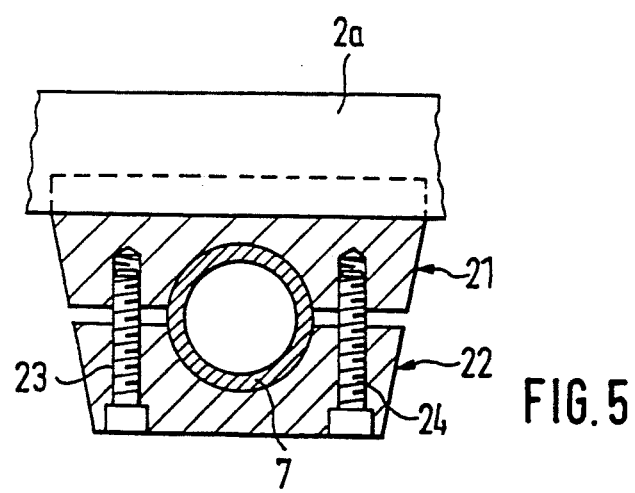
FIG. 5 shows a connection between a handlebar leg and a transverse rod of a racer-type handlebar according to the sectional line 5—5 of FIG. 2

FIG. 5 reveals how the handlebar legs of the aero-type handlebar are connected with the transverse rod 7 of the racer-type handlebar in the present example of embodiment. Clamping blocks 21 and 22 are provided for connection, which have recesses adapted to the round shape of the transverse rod on opposite sides. The clamping element 21 which encompasses the circumference of the handlebar leg partly in form-fit fashion is connected with the handlebar leg 2a, in the present example of embodiment by means of welding. Hexagon socket screws 23 and 24 are provided for clamping the transverse rod 7 between the clamping elements 21 and 22, which engage into threads which are formed in the clamping element 21. The screws 23 and 24 are provided with a thread-free barrel which is guided through threaded bores in the clamping element 22. In this fashion, the screws are captively connected with the clamping element 22. Since, in the present example of embodiment, the fastening of the handlebar legs is effected on the racer-type handlebar in the area of curvature of the bending of the end portions 10a and 10b, the clamping elements 21 and 22 (not shown in FIG. 5) have lateral recesses.

Figure 6:
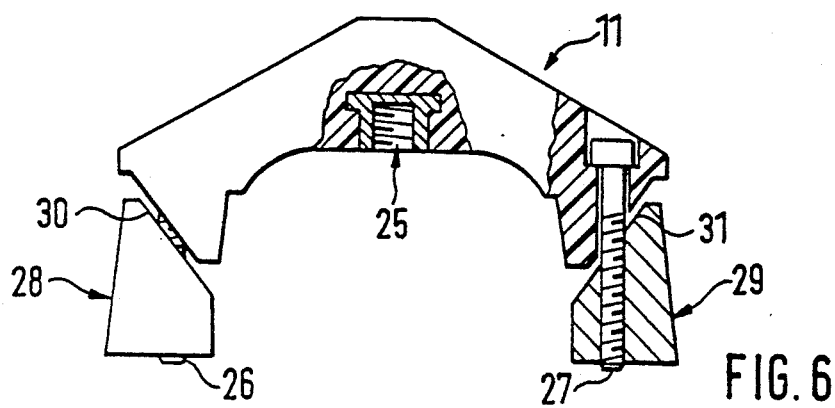
FIG. 6 shows a plastic intermediate element to connect handlebar legs of an aero-type handlebar according to the invention.

As is revealed by FIG. 6, the plastic intermediate element 11 used in the present example of embodiment for an aero-type handlebar for connection of its handlebar legs has a threaded insert 25 of a metal. One-piece clamping elements 28 and 29 of aluminum are provided on the ends of the intermediate element. The clamping pieces have threaded bores into which screws 26 and 27 guided in the plastic element of the intermediate element engage. The clamping elements have abutment surfaces 30 and 31 which are inclined with respect to the screw axes, which can be caused to abut against corresponding surfaces of the plastic element by rotating the screws 26 and 27. The intermediate element 11 can be clamped with the handlebar legs 2a and 2b by rotating the screws 26 and 27.

If the aero-type strap is used the racing cyclist places his forearms on the support elements 5a and 5b, a comfortable support being ensured by the arched asymmetric shape of the support surfaces 6a and 6b, which makes it possible for the racing cyclist to ride more comfortably in the greatly forwardly bent posture which he must adopt when using the aero-type handlebar. The flattening of the handlebar legs which takes place behind the fastening points on the transverse rod of the racer-type handlebar in the riding direction has the advantage that the support elements can be held safely, since moments of tilt can be absorbed due to the support on the widened handlebar leg. The in particular increasing flattening of the legs leads moreover to an increased elasticity of the handlebar legs in the respective area, an advantageous springing of the forearms resting on the support elements resulting from this. A reduced air resistance results moreover from the flattening, and an additional clearance for the access to operating elements which can be attached to the transverse rod of the racer-type handlebar is obtained. The flattening produced in the present example of embodiment by squeezing the pipe forming the handlebar legs could be produced in one handlebar leg from a solid material by means of bezels provided on one side or both sides. It is to be generally understood by flattening here that the height dimension of the handlebar leg is reduced as compared to the remaining, not flattened portions of the handlebar leg. An approximately oval cross-sectional shape results in the flattened area of the handlebar leg in the present example of embodiment. However, the flattening could also be effected by the fact that plane surfaces result on the upper and/or lower side of the handlebar legs. In the shown embodiment, the flattening begins already before the connection point to the handlebar transverse rod, which is advantageous with respect to the stability of the connection, since moments of tilt can be better absorbed by the flattening.

The oblong holes 8a and 8b provided in the present example of embodiment make the locking of the support elements at different points possible so that the aero-type handlebar can be optimally adjusted for different cyclists. Since the screwing of the forearm supports with the handlebar legs is only carried out from above, it can be avoided that screw elements project on the lower side of the handlebar legs which would be a risk of injury upon access to the operating elements on the transverse rod of the racer-type handlebar. Due to the use of a conical washer with a conical recess, an optimum force transmission from the screw to the plastic element 14 in the support elements is obtained.

The measure to design the lower side of the support elements in such fashion that the handlebar legs can be largely encompassed, serves for a further reduction of the air resistance and reduces moreover the risk of injury during access to the operating elements on the racer-type handlebar transverse rod.

Since the handlebar legs are shaped in such fashion in the present example of embodiment that the connection points to the transverse rod of the racer-type handlebar are disposed near the centre of the handlebar, no space for the attachment of operating elements on the transverse rod are lost, and it is possible in the case of an optimum position of the support elements to provide bent end portions with of a relatively great length as in the present example of embodiment, which have advantageous springing properties.

The intermediate element produced from plastic material in the present example of embodiment, which connects the handlebar legs 2a and 2b forming a handlebar strap serves, on the one hand, for the stabilization of the aero-type handlebar, and can, on the other hand, serve for mounting instruments or operating elements such as speed-change levers, it being possible to flange the instruments to the intermediate element such as via the threaded insert 25, or to integrate them in the intermediate element Connecting lines can advantageously be laid in the interior of the handlebar legs. The intermediate element is suitably adapted to the transverse rod of the racer-type handlebar as regards its diameter so that it can accommodate operating elements or instruments adapted to this diameter without any problems.

All or part of the used screws can advantageously be designed as hexagon socket screws which can be rotated with the same wrench, it being possible to provide a mounting for the universal hexagon socket wrench, such as an insert aperture. The front edge of the support elements can advantageously be provided in straight fashion that the support elements can also be used as steering grips with a grip surface adapted to the hand.

The described aero-type handlebar could also be mounted on a handlebar for a mountain bike.

I claim:

1. An aero-type handlebar to be connected to a racer-type handlebar (1) comprising two handlebar legs 2a, 2b) respectively connectable with the racer-type handlebar and projecting in the riding direction beyond grips (3a, 3b) of the racer-type handlebar (1), each said handlebar leg having a grip portion at its forward projecting end for a righthand and a lefthand grip (4a, 4b) respectively, said righthand and lefthand grips (4a, 4b) of said handlebar legs being spaced apart from each other by a distance smaller than a corresponding distance between said grips (3a, 3b) of the racer-type handlebar (1), a forearm support element (5a, 5b) provided on each of said handlebar legs (2a, 2b), each said forearm support element having a support surface (6a, 6b) corresponding to the forearm, said handlebar legs (2a, 2b) having rear end portions (10a, 10b) which are opposed to said grip portions extending backwardly and bending laterally outwardly from said racer-type handlebar, said support elements (5a, 5b) being disposed on said rear end portions of said handlebar legs extending laterally outwardly, and wherein said handlebar legs (2a, 2b) are flattened at condition points with said forearm support elements (5a, 5b).

2. An aero-type handlebar according to claim 1, wherein each said forearm support element (5a, 5b) is disposed substantially on the end of said handlebar leg (2a, 2b) opposite to said projecting grip end.

3. An aero-type handlebar according to claim 1, wherein each said forearm support element (5a, 5b) is disposed directly behind a transverse rod (7) of the racer-type handlebar (1) in the riding direction.

4. An aero-type handlebar according to claim 1, wherein the position of each said forearm support element (5a, 5b) on said handlebar legs (2a, 2b) is adjustable.

5. An aero-type handlebar according to claim 1, wherein said forearm support elements (5a, 5b) are guided on said handlebar legs (2a, 2b) in a slot (8a, 8b) provided in said handlebar legs.

6. An aero-type handlebar according to claim 5, wherein said forearm support elements (5a, 5b) are displaceable along a slot (8a, 8b) by locking means actuable from above said forearm support elements.

7. An aero-type handlebar according to claim 1, wherein the lower side of each said forearm support elements (5a, 5b) has a shape adapted to said handlebar leg in such fashion that said handlebar legs (2a, 2b) is surrounded in form-fit fashion at least across parts of its circumference.

8. An aero-type handlebar according to claim 1, wherein each said support surface (6a, 6b) of said forearm support elements (5a, 5b) has padding.

9. An aero-type handlebar according to claim 1, wherein each said forearm support element (5a, 5b) is disposed at the level of a transverse rod (7) of the racer-type handlebar (1) in the riding direction.

10. An aero-type handlebar according to claim 1, wherein said handlebar legs (2a, 2b) have substantially a circular cross-section.

11. An aero-type handlebar according to claim 1, wherein said handlebar legs (2a, 2b) are formed of a pipe material.

12. An aero-type handlebar according to claim 1, wherein said handlebar legs (2a, 2b) are flattened at the connection points with the racer-type handlebar (1).

13. An aero-type handlebar according to claim 1, wherein the degree of said flattening increases continuously towards the ends of said handlebar legs (2a, 2b) which are opposite to said grip portions.

14. An aero-type handlebar according to claim 1, wherein the racer-type handlebar (1) has a one-membered extension (9) which is connected with its end which is the front end in the riding direction with a transverse rod (7) of the racer-type handlebar (1).

15. An aero-type handlebar according to claim 1, wherein the connection points between said handlebar legs (2a, 2b) and the racer-type handlebar (1) are provided symmetrically to and near the centre of the aero-type handlebar.

16. An aero-type handlebar according to claim 1, wherein said bend end portions (10a, 10b) extend approximately in parallel to said transverse rod (7) of the racer-type handlebar (1).

17. An aero-type handlebar according to claim 16 or 1, wherein said bent end portions (10a, 10b) are bent directly behind said connection points of said handlebar legs (2a, 2b) with the racer-type handlebar (1) in the riding direction.

18. An aero-type handlebar according to claim 1, wherein said connecting points between said handlebar legs (2a, 2b) and the racer-type handlebar (1) are provided in a curvature area of the bending.

19. An aero-type handlebar according to claim 1, wherein said handlebar bar (2a, 2b) are connected with each other at their respective said grip ends projecting in the riding direction forming an aero-type handlebar strap.

20. An aero-type handlebar according to claim 19, wherein said handlebar legs (2a, 2b) are connected with each other via an adapter (11).

21. An aero-type handlebar according to claim 20, wherein said handlebar adapter is formed as a plastic element 11.

22. An aero-type handlebar according to claim 20 or 21, wherein said adapter (11) is provided for mounting accessory instruments.

23. An aero-type handlebar according to claim 1, wherein said grip element of each of said handlebar legs (2a, 2b) is bent obliquely upwardly in the riding direction.

24. An aero-type handlebar according to claim 1, wherein said handlebar legs (2a, 2b) are connected with the racer-type handlebar (1) by clamping elements (12, 12b) disposed below said handlebar legs and encompassing the racer-type handlebar.

25. The invention of claim 8, wherein said padding is selected from the group consisting of air, liquid and foam rubber.

* * * * *

UNITED STATES PATENT AND TRADEMARK OFFICE
CERTIFICATE OF CORRECTION

PATENT NO. : 5,154,094

DATED : October 13, 1992

INVENTOR(S) : Jochen Klieber

It is certified that error appears in the above-identified patent and that said Letters Patent is hereby corrected as shown below:

In Claim 1, column 6, line 51, "condition" should be --connection--.

In Claim 7, column 7, line 7, "elements" should be --element--.

Claim 7, column 7, line 8, "legs" should be --leg--.

Claim 14, column 7, line 34, "end" should be --one--.

Claim 19, column 8, line 15, "bar" should be --legs--.

Claim 21, column 8, line 23, delete "handlebar".

Signed and Sealed this

Nineteenth Day of October, 1993

Attest:

BRUCE LEHMAN

Attesting Officer   Commissioner of Patents and Trademarks